US007698393B2

(12) United States Patent
Milstein et al.

(10) Patent No.: US 7,698,393 B2
(45) Date of Patent: Apr. 13, 2010

(54) METHOD AND SYSTEM FOR SHADOWING INFORMATION BETWEEN COMPUTING DEVICES

(75) Inventors: David Milstein, Redmond, WA (US); Linda Criddle, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 10/809,876

(22) Filed: Mar. 23, 2004

(65) Prior Publication Data

US 2005/0229036 A1    Oct. 13, 2005

(51) Int. Cl.
    *G06F 15/177* (2006.01)
(52) U.S. Cl. ........................... 709/221; 709/227
(58) Field of Classification Search ............. 709/220, 709/227; 70/221
    See application file for complete search history.

(56) References Cited

U.S. PATENT DOCUMENTS

| 5,721,916 A * | 2/1998 | Pardikar ............... 707/201 |
| 6,810,405 B1 * | 10/2004 | LaRue et al. ............ 707/201 |
| 7,124,291 B1 * | 10/2006 | Fresko .................... 713/1 |
| 2003/0053631 A1 * | 3/2003 | Un ......................... 380/277 |

OTHER PUBLICATIONS

Lalana Kagal et al.; "A Policy Language for a Pervasive Computing Environment"; *Proceedings of the 4th International Workshop on Policies for Distributed Systems and Networks (POLICY '03)*; IEEE 2003; pp. 63-74.

Robert Steele; "A Web Services-based System for Ad-hoc Mobile Application Integration"; *Proceedings of the International Conference on Information Technology: Computers and Communications (ITCC '03)*; IEEE 2003; pp. 248-252.

Anupam Joshi et al.; "Agents, Mobility, and M-services: Creating the Next Generation Applications and Infrastructure on Mobile Ad-Hoc Networks", *Developing an Infrastructure for Mobile and Wireless Systems*; Springer-Verlag Berlin Heidelberg 2002; pp. 106-118.

Harry Chen et al.; "Dynamic Service Discovery for Mobile Computing: Intelligent Agents Meet Jini in the Aether"; *Cluster Computing* vol. 4, No. 4; Kluwer Academic Publishers 2001; pp. 343-354.

Brad A. Myers; "Mobile Devices for Control"; *Human Computer Interaction with Mobile Devices*; Springer-Verlag Berlin Heidelberg, 2002; pp. 1-8.

\* cited by examiner

*Primary Examiner*—Ramy M Osman
*Assistant Examiner*—Marshall McLeod
(74) *Attorney, Agent, or Firm*—Merchant & Gould; Ryan T. Grace

(57) ABSTRACT

A method and system for seamlessly integrating computing devices shadow information between computing devices. The transfer of information proceeds in accordance with user-defined preferences. While a user is interacting with an application on one computing device, the application is shadowed to another computing device. Since the information is shadowed, the user may continue interacting with the application on the other communication device at any point without first having to perform a synchronization.

15 Claims, 4 Drawing Sheets

METHOD AND SYSTEM FOR SHADOWING INFORMATION BETWEEN COMPUTING DEVICES

BACKGROUND OF THE INVENTION

A mobile device can synchronize data with a personal computer by connecting a mobile device to a personal computer and running a synchronization program. The data transferred, however, is limited to content supported by the application stored on both the mobile device and the personal computer.

SUMMARY OF THE INVENTION

The present invention relates to a method and system for seamlessly integrating computing devices by shadowing information between the computing devices. The transfer of information proceeds in accordance with user-defined preferences. While a user is interacting with an application on one computing device, information relating to the application is shadowed to another computing device. Since the information is shadowed, the user may continue interacting with the application on the other computing device at any point without first having to perform a synchronization.

In one aspect of the invention, two computing devices are coupled together. A determination is made whether to shadow an application that is running on a computing device. Information associated with the application is shadowed to another computing device such that the other computing device includes current state and data of the application during the shadowing.

In another aspect, a first computing device and a second computing device each include a shadow manager that is arranged to manage settings associated with an application. The shadow manager shadows information between the first and second computing devices when the application is active such that a current state and data of the active application is available on the first and second computing devices.

DETAILED DESCRIPTION OF THE PREFERRED EMBODIMENT

Briefly stated, the present invention relates to a method and system for seamlessly integrating computing devices by shadowing information between the computing devices. The transfer of information proceeds in accordance with user-defined preferences. While a user is interacting with an application on one computing device, the application is shadowed to another computing device. Since the information is shadowed, the user may continue interacting with the application on the other communication device without first having to perform a synchronization.

For example, a user may be creating a document in an e-mail application on a personal computer. The user may need to leave the vicinity of the personal computer before the document is complete. In accordance with the present invention, information associated with the e-mail application is shadowed from the personal computer to the user's mobile device such that the e-mail document appears on the mobile device without having to manually synchronize the data. The user may then complete and send the e-mail message using the mobile device.

Illustrative Operating Environment

Figure 1:
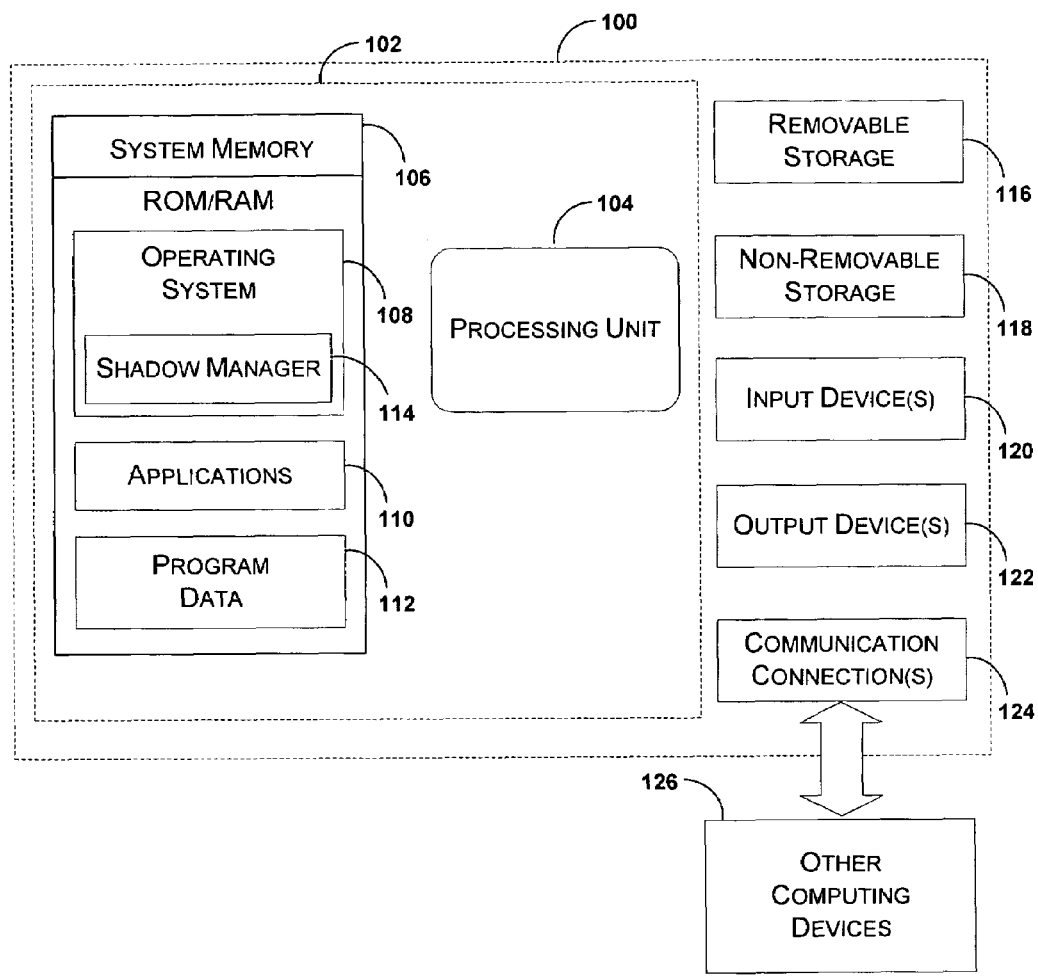
FIG. 1 shows a functional block diagram of an example computing environment in which the present invention may be implemented.

With reference to FIG. 1, one example system for implementing the invention includes a computing device, such as personal computer 100. A basic configuration includes those components within dashed line 102. In the basic configuration, personal computer 100 typically includes at least one processing unit 104 and system memory 106. Depending on the exact configuration and type of computing device, system memory 106 may be volatile (such as RAM), non-volatile (such as ROM, flash memory, etc.) or some combination of the two. System memory 106 typically includes operating system 108, one or more applications 110, and may include program data 112. Operating system 108 includes shadow manager 114. Shadow manager 114 is configured to shadow data associated with another computing device, such as a communication device, which is explained in detail below.

Personal computer 100 may have additional features or functionality. For example, personal computer 100 may also include additional data storage devices (removable and/or non-removable) such as, for example, magnetic disks, optical disks, or a memory stick. Such additional storage is illustrated in FIG. 1 by removable storage 116 and non-removable storage 118. Computer storage media may include volatile and non-volatile, removable and non-removable media implemented in any method or technology for storage of information, such as computer readable instructions, data structures, program modules, or other data. System memory 106, removable storage 116 and non-removable storage 118 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 100. Any such computer storage media may be part of computer 100. Personal computer 100 may also have input device(s) 120 such as keyboard, mouse, pen, voice input device, touch input device, etc. Output device(s) 122 such as a display, speakers, printer, etc. may also be included.

Personal computer 100 may also contain communication connections 124 that allow the computer to communicate with other computing devices 126, such as over a network. Communication connection 122 is one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
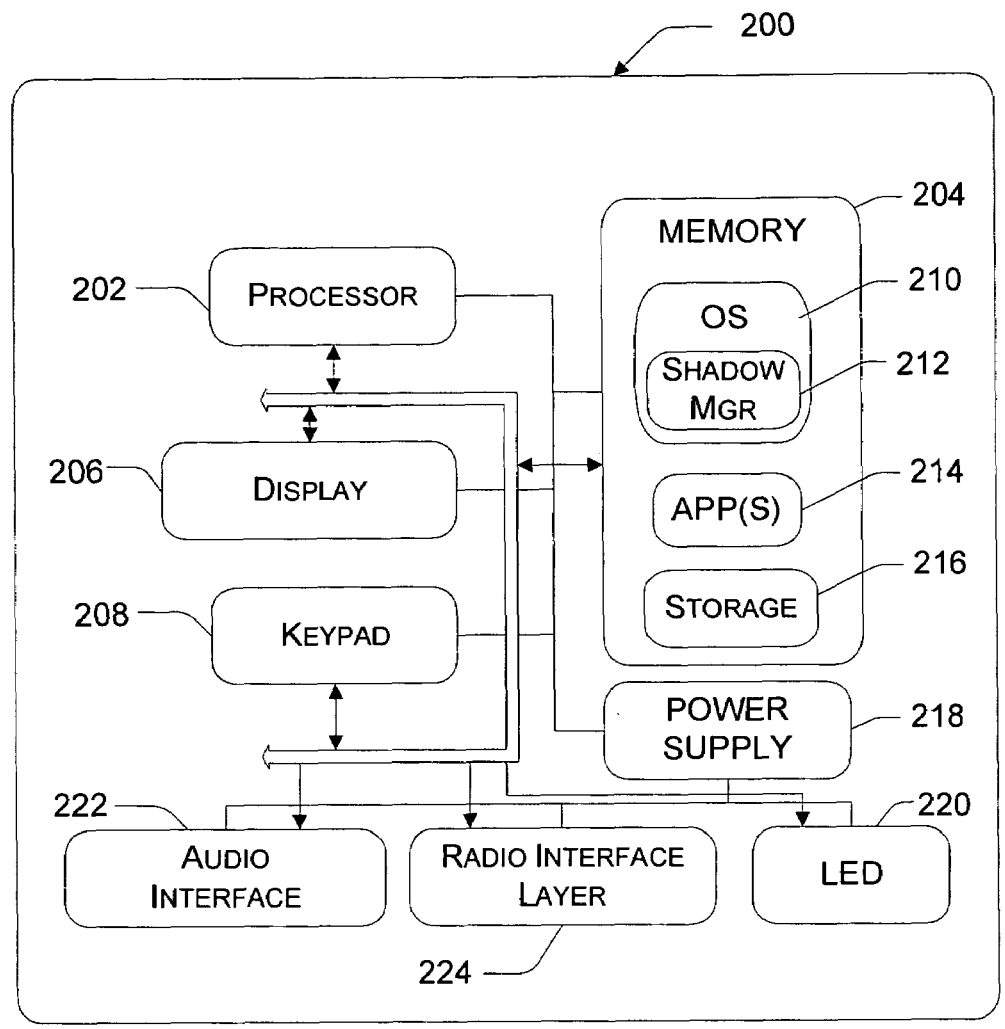
FIG. 2 shows a functional block diagram of an example communication device in which the present invention may be implemented.

FIG. 2 is a functional block diagram illustrating an embodiment of an exemplary communication device for practicing the present invention. In one embodiment of the present invention, communication device 200 is implemented as a mobile communication device, such as a personal digital assistant (PDA), smart phone, mobile phone, and the like. Communication device 200 may also include handheld computers, tablet computers, personal computers, multiprocessor systems, microprocessor-based or programmable consumer electronics, network PCs, wearable computers, and the like.

Communication device 200 may include many more components than those shown in FIG. 2. The components shown, however, are sufficient to disclose an illustrative embodiment for practicing the invention.

As shown in the figure, communication device 200 includes processor 202, memory 204, display 206, and keypad 208. Memory 204 generally includes both volatile memory (e.g., RAM) and non-volatile memory (e.g., ROM, Flash Memory, or the like). Display 206 may be a liquid crystal display, or any other type of display commonly used in mobile communication devices. For example, display 206 may be touch-sensitive, and would then also act as an input device enabling entry of FE language strokes. Keypad 208 may be a push button numeric dialing pad (such as on a typical telephone), or a multi-key keyboard (such as a conventional keyboard).

Communication device 200 includes an operating system 210, such as the Windows CE operating system from Microsoft Corporation or other such operating system, which is resident in memory 204 and executes on processor 202. Operating system 210 includes shadow manager 212. Shadow manager 212 is configured to shadow data associated with another computing device such a personal computer, which is explained in detail below.

One or more application programs 214 are loaded into memory 204 and run on operating system 210. Examples of application programs include phone dialer programs, content manager, email programs, scheduling programs, word processing programs, spreadsheet programs, smart filter, and so forth. Communication device 200 also includes non-volatile storage 216 within memory 204. Non-volatile storage 216 may be used to store persistent information which should not be lost if the communication device 200 is powered down. The application programs 214 may use and store information in storage 216, such as e-mail or other messages used by an e-mail application, contact information, databases, and the like, used by the content manager, appointment information used by a scheduling program, documents used by a word processing application, and the like. A shadowing application may also reside on communication device 200 to provide functionality to shadow manager 212. The shadowing application is programmed to interact with a corresponding shadowing application resident on a host computer, such as personal computer 100, to keep the information stored in storage 216 current with corresponding information stored at personal computer 100.

Communication device 200 also includes power supply 218, which may be implemented as one or more batteries. Power supply 218 might further include an external power source, such as an AC adapter or a powered docking cradle that supplements or recharges the batteries.

Communication device 200 is also shown with two types of external notification mechanisms: LED 220 and audio interface 222. These devices may be directly coupled to power supply 218 so that when activated, they remain on for a duration dictated by the notification mechanism even though processor 202 and other components might shut down to conserve battery power. LED 220 may be programmed to remain on indefinitely until the user takes action to indicate the powered-on status of the device. Audio interface 222 is used to provide audible signals to and receive audible signals from the user. For example, audio interface 222 may be coupled to a speaker for providing audible output and to a microphone for receiving audible input, such as to facilitate a telephone conversation.

Communication device 200 also includes communication connections, such as radio interface layer 224, that perform the function of transmitting and receiving radio frequency communications. Radio interface layer 222 facilitates wireless connectivity between communication device 200 and the outside world, via a communications carrier or service provider. Radio interface layer 222 also supports different localized wireless capabilities such as Bluetooth, wire fidelity (Wi-Fi), etc. Transmissions to and from radio interface layer 224 are conducted under control of operating system 210. In other words, communications received by radio interface layer 224 may be disseminated to application programs 214 via operating system 210, and vice versa.

Radio interface layer 224 allows communication device 200 to communicate with other computing devices, such as over a network. Radio interface layer 224 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Data Shadowing between Computing Devices

Figure 3:
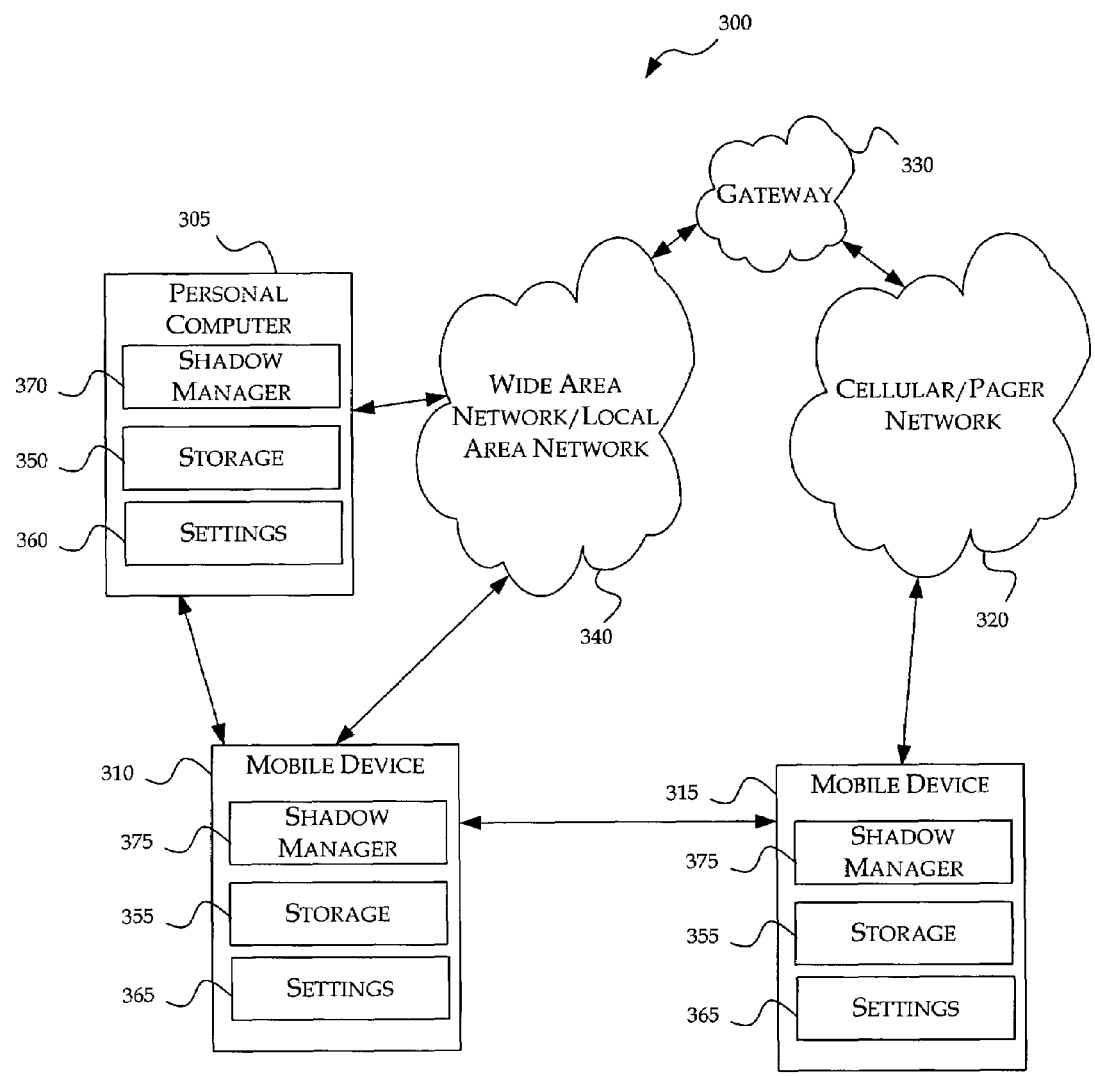
FIG. 3 is a functional block diagram generally illustrating a system for shadowing information between computing devices in accordance with the present invention.

FIG. 3 is a functional block diagram generally illustrating a shadowing system for integrating computing devices by shadowing information in accordance with the present invention. Shadowing system 300 includes a computing device, such as personal computer 305, and mobile devices 310, 315. Personal computer 305 is a computing device such as the one described above in conjunction with FIG. 1, and mobile devices 310, 315 are communication devices such as the one described above in conjunction with FIG. 2. Information may be transmitted directly between mobile device 310 and personal computer 305, and between mobile devices 310, 315. In one embodiment, mobile device 310 is directly connected to personal computer 305 by a cable. In another embodiment, mobile device 310 is coupled to personal computer 305 over a wireless connection, such as Bluetooth or Wi-Fi.

Shadowing system 300 may further include cellular/pager network 320, gateway 330, and wide area network (WAN)/local area network (LAN) 340. Information may be shadowed between personal computer 305 and mobile device 310 through WAN/LAN 340. Cellular/pager network 320 is a network that transmits information to and from wireless devices, such as mobile devices 310, 315. Cellular/pager network 320 may include both wireless and wired components. Gateway 330 provides a means for transporting information between WAN/LAN 340 and cellular/pager network 320. Information may be shadowed between personal computer 305 and mobile device 315 through WAN/LAN 340, gateway 330 and cellular/pager network 320. Information may also be shadowed between mobile devices 310, 315 through WAN/LAN 340, gateway 330 and cellular/pager network 320.

Shadowing system 300 shadows information associated with an actively running application such that a current state and data of the running application is available on personal computer 305 and mobile device 310. Application information may also be shadowed between mobile devices 310 and 315. Shadowing refers to the real time sharing of information associated with an application actively running on one computing device to at least one other computing device, that generally includes the most current state information and data associated with the active application. For example, a user may be listening to music from an MP3 play list stored on mobile device 310. When the user comes into proximity with personal computer 305, mobile device 310 shadows the MP3 application to personal computer 305 such that the user may access the MP3 play list on personal computer 305 at the same point as on mobile device 310. Likewise, when the user leaves the vicinity of personal computer 305 with mobile device 310, the song list plays on mobile device 310 from the same point where it was playing on personal computer 305.

In another embodiment, the user may use mobile device 310 to resume watching video from the same location where the video was interrupted on personal computer 305. In another embodiment, when the user is browsing the web on personal computer 305 and resumes browsing on mobile device 310, mobile device 310 opens the browser and links to the web page where connection was transferred from personal computer 305 to mobile device 310. Thus, the user is not required to remember the page sequence and history of the current uniform resource location (URL).

In another embodiment, a user participates in a voice-over Internet protocol (IP) phone call using personal computer 305. Previously, when the user wanted to leave the area where personal computer 305 was located, the user would tell the other person to call mobile device 310 in a few minutes. The user would then terminate the call from personal computer 305, connect mobile device 310 to personal computer 300, and transfer the related data from personal computer 305 to mobile device 310. By shadowing application information of mobile device 310 and personal computer 305, the user may switch from the voice-over IP phone call on personal computer 305 and continue speaking on mobile device 310 without interruption.

Information shadowing may occur automatically or manually based on settings selected by the user. The user selections for personal computer 305 and mobile devices 310, 315 may be stored in storage 350, 355 and used in settings applications 360, 365. For manual shadowing, the user interface prompts the user to initiate the process before shadowing begins. Manual shadowing may be useful with applications such as gaming and e-mail messaging. Automatic shadowing may be useful with applications for playing video, web browsing, and word processing. In one embodiment, document revision information is automatically shadowed for document data that was previously shadowed between mobile device 310 and personal computer 305.

Automatic shadowing may be applied to one-way information transfer. For example, shadowing may occur automatically for the transfer of information from personal computer 305 to mobile device 310. Thus, when a user completes a personal computer session, all related information is automatically shadowed to mobile device 310. When the user wants to access the information on a different personal computer, the user is prompted by mobile device 310 before the information is shadowed to the personal computer. In one embodiment, a manual shadow prompt appears on the user interface of mobile device 310. For example, the manual shadow prompt may read as follows, "A trusted personal computer is sensed nearby. The following information is available for transfer. Do you want to shadow all available information?"

Mobile devices 310, 315 and personal computer 305 may inform the user that shadowing is in progress via a user interface. The user interface may provide feedback about the status of the shadowing process. In one embodiment, a progress bar indicates that shadowing is in progress and the amount of time remaining before the process is complete.

Personal computer 305 and mobile devices 310, 315 each include storage 350, 355, settings application 360, 365, and shadow manager 370, 375. Shadow manager 370, 375 is an operating system application for managing settings associated with personal computer 305 and mobile devices 310, 315. In one embodiment, the user may establish parameters related to information shadowing scenarios when an application is first installed on mobile devices 310, 315 or personal computer 305. For example, the user can establish which scenarios are enabled, and whether information is shadowed manually or automatically. In another embodiment, the user can establish the parameters when the shadowing feature is enabled. The established parameters are stored in storage 350, 355 for use in settings applications 360, 365.

The operating system exposes an application program interface (API) that allows applications to register with the shadow manager. For example, a mobile device application on personal computer 305 registers with and communicates shadowing information to shadow manager 375 to establish a data transfer relationship. The shadowing information may include the type of information and data supported by the application. For example, a Microsoft Word® application is registered such that shadow managers 370, 375 are aware of state information associated with the application and that the application can handle documents with certain file identifiers, such as .doc or .ltf. The shadowing information can also include user-established settings to determine whether the application supports automatic and/or manual shadowing.

Shadow managers 370, 375 determine whether to shadow information associated with applications. According to one embodiment, information is shadowed by a synchronization engine. The operating system creates an interface between an API and the corresponding shadow manager when the application supports shadowing. An interface is not established if the application does not support shadowing. The interface provides a connection between an application being shadowed and the corresponding shadow manager.

Shadow managers 370, 375 may authenticate data transfer without any further input from the application. For example, shadow managers 370, 375 are responsible for: locating personal computer 305 and mobile devices 310, 315, ensuring that any applicable digital rights management is in place, transferring application data and related settings, and the like. Shadow managers 370, 375 ensure that the data shadowing system is completely extensible. Thus, each application provider is not required to understand how mobile devices 310, 315 are coupled to personal computer 305.

When mobile device 310 becomes active for automatically shadowing data from personal computer 305, shadow manager 375 activates the appropriate application on mobile device 310 through the established interface. If mobile device 310 is configured for manual shadowing, shadow manager 375 prompts the user to select whether shadowing should proceed or wait until later. If mobile device 310 is configured for automatic shadowing, the application is shadowed once it begins running on personal computer 305.

The user may operate mobile device 310 and manipulate the new information shadowed from personal computer 305 at almost any point during the shadowing. Personal computer 300 may remain coupled to mobile device 310 in an active or passive shadowing state. The state of personal computer 305 is based on user-defined settings and device capabilities. For active shadowing, personal computer 305 continually shadows the operations and the content that the user is creating and using on mobile device 310. No further user action is required to transfer the data to personal computer 305. For passive shadowing, personal computer 305 does not shadow the data generated by mobile device 310. The user initiates the shadowing process by selecting a particular application.

An extended authentication process may be avoided by forming a partnership between personal computer 305 and mobile devices 310, 315 based on digital certificates. The first time mobile device 310, 315 couples to personal computer 305 and shadows data, a root certificate and a personalized certificate are exchanged between and stored in personal computer 305 and mobile device 310, 315. Mobile device 310, 315 recognizes personal computer 305 after any subsequent coupling because mobile device 310, 315 identifies the root certificate associated with personal computer 305. In other words, personal computer 305 is a "semi-trusted" computing device. A "trusted" computing device refers to a device that the user has configured to shadow information associated with another device. A device may be "non-trusted" if mobile device 310 does not recognize a root certificate associated with the device, or if the device was not configured to shadow application information associated with mobile device 310, 315.

The user may activate settings application 360 of personal computer 305 such that personal computer 305 may or may not recognize mobile device 310, 315. As discussed above, the digital certificate associated with personal computer 305 may already be stored on mobile device 310, 315. The user determines whether or not mobile device 310, 315 should be discoverable by personal computer 300. If personal computer 305 is set to discover mobile device 310, 315, the user then determines how information between the devices is shadowed.

After the user configures settings application 360 for personal computer 305, the same process occurs for settings application 365 of mobile device 310, 315. A user may select a first tier of communication devices that may couple to mobile device 310, 315 and how the shadowing proceeds between the two devices (i.e., automatically or manually). The user may also select a second tier of mobile devices that are prevented from coupling to mobile device 310, 315.

After configuring personal computer 305 and mobile device 310, 315, the settings are established. Each time that mobile device 310, 315 and personal computer 305 are coupled together, shadowing occurs according to the established instructions. For example, personal computer 305 couples to mobile device 310 via a wireless connection. Two-sided authentication occurs between the devices based on digital certificates. Personal computer 305 is configured to authorize mobile device 310 to shadow information associated with an application of personal computer 305. Likewise, mobile device 310 is configured to authorize personal computer 305 to recognize it before shadowing can occur between the two devices.

Operating system code shadows the application information associated with the two devices according to settings that identify established, permissible operations between personal computer 305 and mobile device 310, 315. Permissible operations may depend on whether mobile device 310, 315 is a "trusted" device associated with a different user than the owner of personal computer 305, a "semi-trusted" device that has a root certificate recognized by personal computer 305, or a "non-trusted" device.

For example, a personal computer may be configured to shadow any application information available on any mobile device, while a mobile device may be configured to recognize only "trusted" devices (i.e., the personal computer is a "non-trusted" device). (The mobile device has not previously shadowed information with the personal computer, nor has the mobile device been configured to shadow information with the personal computer.) When the mobile device couples to the personal computer, the mobile device does not recognize the personal computer. In another embodiment, the personal computer may be a "trusted" device but it has not been configured to shadow information with the mobile device. The mobile device prompts the user for authorization before shadowing information to the personal computer.

In another example, a personal computer assigned to one user in a private office is typically configured to prevent others from using a mobile device to shadow application information on the personal computer. In one embodiment, a small company or department may allow a select group of people to access each other's computers and shadow information for a specific purpose. For example, one user may have access to another's personal computer for limited uses such as printing documents. In another embodiment, an entire family is authorized to shadow information associated with a personal computer, but anyone outside the immediate family is prevented from accessing the information.

In contrast, a public computer, such as a personal computer in a conference room or a classroom, may be configured to shadow the behavior of any mobile device. The public personal computer recognizes the mobile device, and then seeks shadowing authorization from the mobile device. When authorization is received, information is transferred from the mobile device to the public personal computer such that the user can access the information on the public personal computer.

For example, a user may have a Microsoft PowerPoint® document loaded onto their mobile device. The user may then access a public personal computer in a conference room to present the document to a group. The user may make edits to the document during the presentation using the personal computer. However, since the user is the only one authorized to access the document, the document does not remain available on the public personal computer. The edited document is only available on the mobile device. The document may then be shadowed to an authorized personal computer.

Information associated with an application on personal computer 305 may be shadowed to another personal computer using mobile device 310, 315. However, mobile device 310, 315 is not required to support the application to transfer the information between two personal computers. For example, a Microsoft PowerPoint® document can be downloaded to mobile device 310 even though the application is not supported (i.e., the document cannot be accessed on mobile device 310). However, shadow manager 375 of mobile device 310 is aware of the origin of the document and manages the document based on user-defined settings associated with the document. The document can be uploaded from mobile device 310 to another personal computer that supports Microsoft PowerPoint® after the user's settings are allowed and authentication passes. The user can then access the document on the personal computer. When the user session is finished, a revised copy of the document is shadowed to mobile device 310. The revised copy may then be shadowed to the user's personal computer.

Digital rights management (DRM) may be enforced during shadowing. The unauthorized transfer of copyrighted data (e.g., a song) between computing devices can be prevented. In one embodiment, mobile device 310, 315 may not shadow information related to unsupported applications because the data is encrypted. In another embodiment, a digital certificate associated with the copyrighted information may only allow the information to be used with particular hardware. For example, copyright protected digital video disc (DVD) content may only be used with authorized video players. In another embodiment, the copyrighted content attaches to digital certificates associated with personal computer 305 and mobile device 310, 315. For example, a user can download copyrighted DVD content from personal computer 305 to mobile device 310. The user can then upload the data from mobile device 310 to a public personal computer to view the content. DRM prevents the public personal computer from illegally sharing the copyrighted content with subsequent users or from transferring the content to other computing devices.

Figure 4:
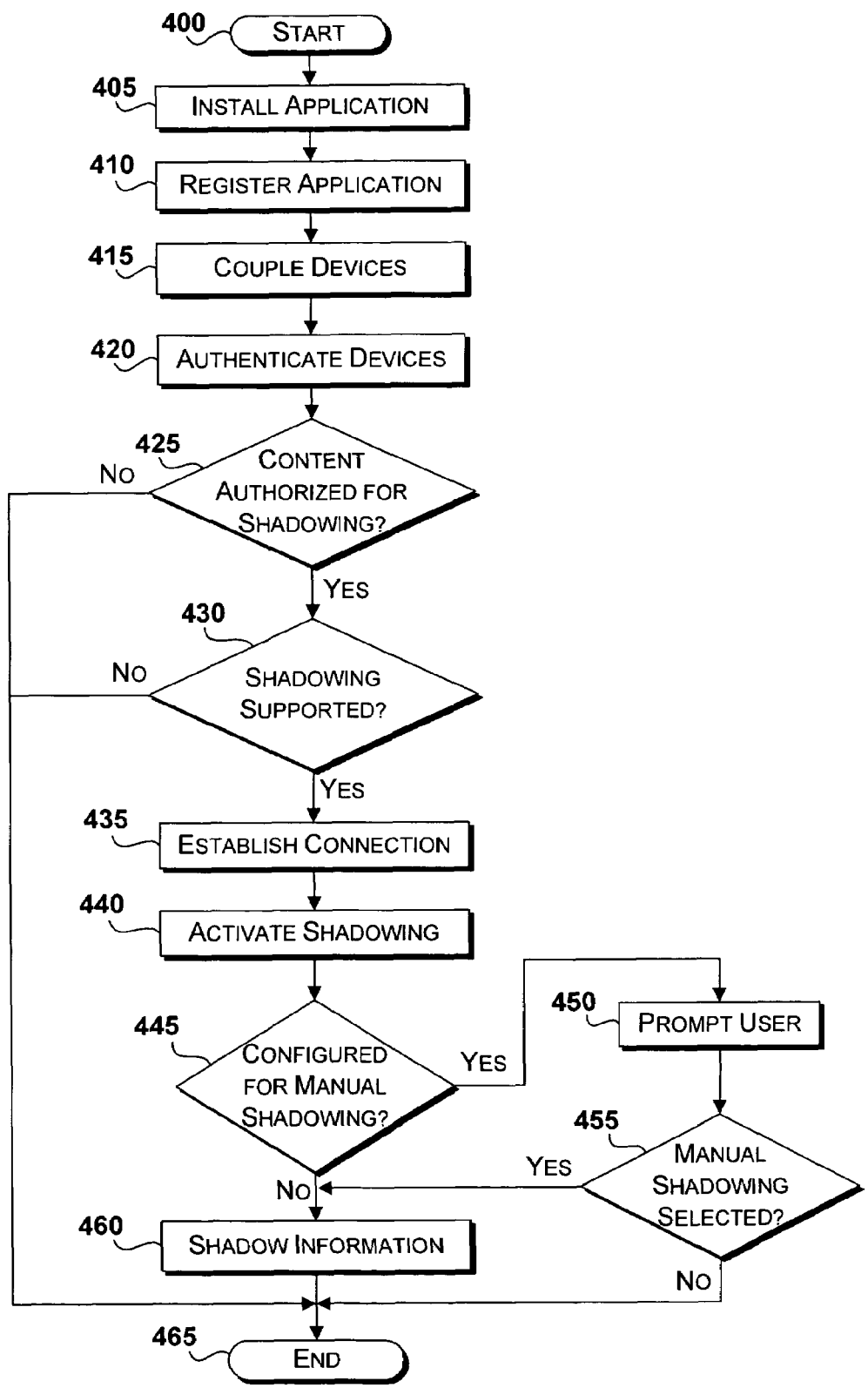
FIG. 4 is an operational flow diagram illustrating a process for shadowing information between computing devices in accordance with the present invention.

FIG. 4 is an operational flow diagram illustrating the process for shadowing information between two computing devices. The process begins at block 400 where information available on one computing device, such as a mobile device, is not available on another computing device, such as a personal computer. Processing proceeds to block 405.

At block 405, an application is installed on a computing device. The user selects settings relating to shadowing associated with the application and the computing device during installation. In one embodiment, the user may establish the type of data supported by the application. The user may also select which computing devices are authorized to couple to the computing device for possible shadowing capabilities. According to one embodiment, the computing device ignores unauthorized computing devices. The settings may also establish whether the application supports manual or automatic shadowing. Processing transfers to block 410.

At block 410, the application registers with the shadow manager of the computing device. The computing device communicates shadowing information, including the settings established by the user, to the shadow manager during application registration. Processing moves to block 415.

At block 415, the computing device is coupled with another computing device. In one embodiment, a wireless connection may be used to couple the computing devices. For example, the mobile device and the personal computer sense each other and are coupled together using Bluetooth or Wi-Fi technology. In another embodiment, the computing device can be coupled using a cable. When coupling the computing devices, the operating system of the computing devices sends a system event to the applications that are to be shadowed to inform the applications that a coupling has occurred. Processing continues at block 420.

At block 420, the computing devices are authenticated to prevent communication between unauthorized devices. In one embodiment, authentication is based on digital certificates. The computing devices recognize each other as authentic if shadowing authentication had previously occurred between the devices. In one embodiment, the computing device alerts the user if the computing devices do not recognize each other. Processing advances to decision block 425.

At decision block 425, a determination is made if the information to be shadowed is authorized for shadowing. Authorization is determined by the user-defined settings that establish which types of information are available for data shadowing. For example, for copyright protected content, the computing devices exchange DRM cryptograms to verify authorization. If the content is authorized for shadowing, processing proceeds to decision block 435. If the devices are not authorized, processing terminates at end block 465.

At decision block 430, a determination is made whether the application supports shadowing based on the settings. The settings may be user-established or inherent in the application. If shadowing is supported, processing flows to block 435. If shadowing is not supported, processing terminates at end block 465.

At block 435, a connection is established between the active application and the shadow manager of the computing device. Processing then proceeds to block 440.

At block 440, the shadow manager begins shadowing the application through the established connection. Processing continues at decision block 445.

At decision block 445, a determination is made whether the other computing device is configured for manual or automatic shadowing. In one embodiment, the user configures the device. If the device is configured to support manual shadowing, processing transfers to block 450. If the device is configured to support automatic shadowing, processing transfers to block 460.

At block 450, the user is prompted to activate manual shadowing. A message may appear on the user interface of the other computing device that asks a user to activate shadowing. Processing moves to decision block 455.

At decision block 455, a determination is made whether the user has selected to initiate manual shadowing. If the user selects to proceed with manual shadowing, processing advances to block 460. If the user does not activate manual shadowing, processing terminates at block 465.

At block 460, the computing device communicates to the other computing device the status and data of each shadowed application that is actively running on the computing device. The information that is shadowed includes both data and status information such that the application on the other computing device is fully integrated with the application on the device running the applications. For example, the information that is shadowed in a web application includes the content of the current web page as well as the URL history information such that the user can continue navigating the web from the same location after the information is shadowed. Processing terminates at end block 465.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for shadowing a current runtime execution between a first computing device and a second computing device, the method comprising:

associating shadow settings with an application of the first computing device, wherein the shadow settings include at least one member of a group comprising: supported file identifiers of the application, computing device identifiers for identifying computing devices having authority to couple to the first computing device, a manual shadowing setting, and an automatic shadowing setting;

registering the application of the first computing device with a shadow manager, wherein the shadow manager is on the first computing device, and wherein registering the application includes communicating the settings to the shadow manager;

receiving a system event on the computing device, wherein the system event indicates a coupling of the second computing device to the first computing device;

upon receiving the system event, determining whether shadowing is supported according to the settings communicated to the shadow manager;

when shadowing is supported, copying, by the shadow manager of the first computing device, the state of the current runtime execution of the application to the second computing device to cause the second computing device to execute an application on the second computing device with the same current runtime as the current runtime execution of the application on the first computing device without synchronization of the second computing device with the first computing device, wherein the current runtime execution of the application is associated with at least one member of a group comprising: the current runtime execution of a music application, the current runtime execution of a video application, the current runtime execution of a voice application, the current runtime execution of an internet application, and the current runtime execution of desktop application.

2. The computer implemented method of claim 1, wherein determining whether shadowing is supported includes determining whether the shadow settings include at least one member of a group comprising: manual shadowing and automatic shadowing.

3. The computer implemented method of claim 1, wherein determining whether shadowing is supported includes confirming a digital certificate associated with the first computing device and the second computing device.

4. The computer implemented method of claim 1, wherein determining whether shadowing is supported includes accessing digital rights management information associated with the application of the first computing device to determine whether shadowing is supported.

5. The computer implemented method of claim 1, further comprising ignoring the second computing device when shadowing is not supported.

6. A computer-readable storage medium having computer executable instructions for shadowing a current runtime execution between a first computing device and a second computing device, the instructions comprising:

associating shadow settings with an application of the first computing device, wherein the shadow settings include at least one member of a group comprising: supported file identifiers of the application, computing device identifiers for identifying computing devices having authority to couple to the first computing device, a manual shadowing setting, and an automatic shadowing setting;

registering the application of the first computing device with a shadow manager, wherein the shadow manager is on the first computing device, and wherein registering the application includes communicating the settings to the shadow manager;

receiving a system event on the computing device, wherein the system event indicates a coupling of the second computing device to the first computing device;

upon receiving the system event, determining whether shadowing is supported according to the settings communicated to the shadow manager;

when shadowing is supported,
sharing, by the shadow manager of the first computing device, data of the current runtime execution of the application to the second computing device, wherein the data of the current runtime execution of the application is configured to cause the second computing device to execute an application on the second computing device with substantially the same current runtime as the current runtime execution of the application on the first computing device without synchronization of the second computing device with the first computing device, wherein the data of the current runtime execution of the application is associated with at least one member of a group comprising: the current runtime execution of a music application, the current runtime execution of a video application, the current runtime execution of a voice application, the current runtime execution of an internet application, and the current runtime execution of desktop application.

7. The computer readable storage medium of claim 6, wherein determining whether shadowing is supported includes determining whether the shadow settings include at least one member of a group comprising: manual shadowing and automatic shadowing.

8. The computer readable storage medium of claim 6, wherein determining whether shadowing is supported includes confirming a digital certificate associated with the first computing device and the second computing device.

9. The computer readable storage medium of claim 6, wherein determining whether shadowing is supported includes accessing digital rights management information associated with the application of the first computing device to determine whether shadowing is supported.

10. The computer readable storage medium of claim 6, further comprising ignoring the second computing device when shadowing is not supported.

11. A system for shadowing a current runtime execution between a first computing device and a second computing device, the system comprising:

a processor; and a memory having computer executable instructions, wherein the computer executable instructions are configured for:

associating shadow settings with an application of the first computing device, wherein the shadow settings include at least one member of a group comprising: supported file identifiers of the application, computing device identifiers for identifying computing devices having authority to couple to the first computing device, a manual shadowing setting, and an automatic shadowing setting;

registering the application of the first computing device with a shadow manager, wherein the shadow manager is on the first computing device, and wherein registering the application includes communicating the settings to the shadow manager;

receiving a system event on the computing device, wherein the system event indicates a coupling of the second computing device to the first computing device;

upon receiving the system event, determining whether shadowing is supported according to the settings communicated to the shadow manager;

when shadowing is supported, copying, by the shadow manager of the first computing device, data of the current runtime execution of the application to the second computing device to cause the second computing device to execute an application on the second computing device with substantially the same current runtime as the current runtime execution of the application on the first computing device without synchronization of the second computing device with the first computing device, wherein the data of the current runtime execution of the application is associated with at least one member of a group comprising: the current runtime execution of a music application, the current runtime execution of a video application, the current runtime execution of a voice application, the current runtime execution of an internet application, and the current runtime execution of desktop application.

12. The system of claim 11, wherein determining whether shadowing is supported includes determining whether the shadow settings include at least one member of a group comprising: manual shadowing and automatic shadowing.

13. The system of claim 11, wherein determining whether shadowing is supported includes confirming a digital certificate associated with the first computing device and the second computing device.

14. The system of claim 11, wherein determining whether shadowing is supported includes accessing digital rights management information associated with the application of the first computing device to determine whether shadowing is supported.

15. The system of claim 11, further comprising ignoring the second computing device when shadowing is not supported.

* * * * *